July 28, 1964 A. F. FARR 3,142,719
AUTOMATIC FLUID SAMPLING AND PHOTOMETRIC TESTING APPARATUS
Filed Sept. 4, 1962 3 Sheets-Sheet 1
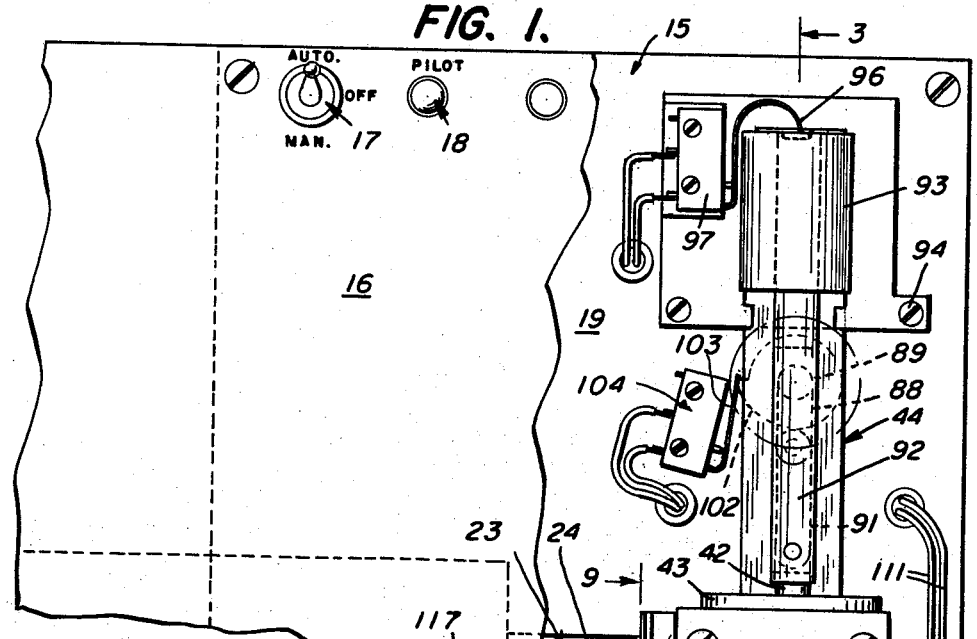
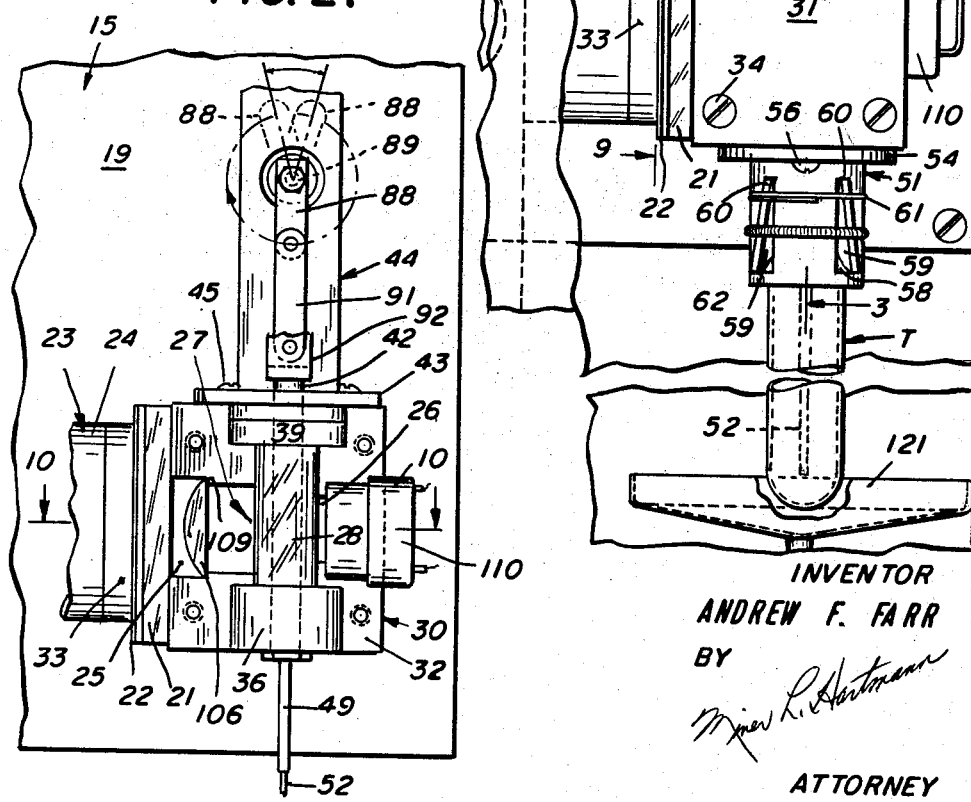
INVENTOR
ANDREW F. FARR
BY
ATTORNEY July 28, 1964
A. F. FARR
3,142,719
AUTOMATIC FLUID SAMPLING AND PHOTOMETRIC TESTING APPARATUS
Filed Sept. 4, 1962
3 Sheets-Sheet 2
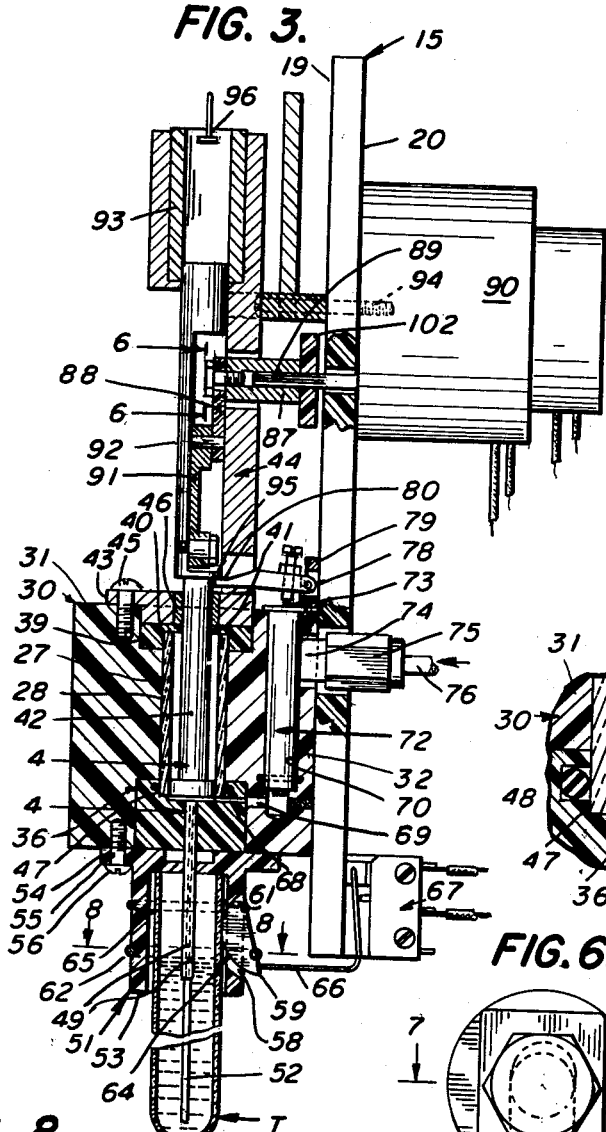
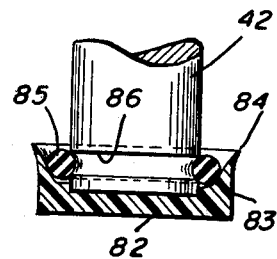
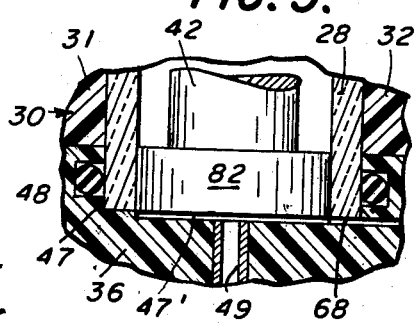
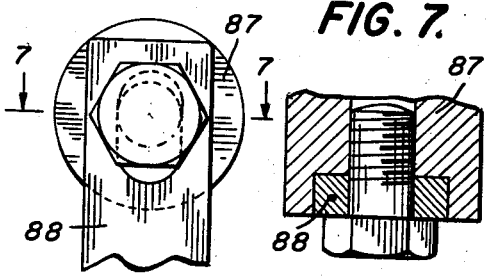
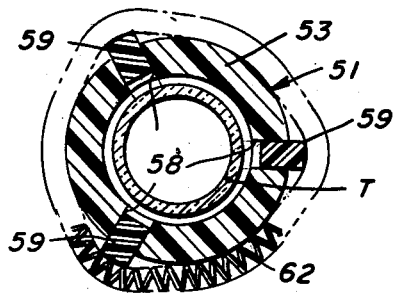
INVENTOR
ANDREW F. FARR
BY
ATTORNEY July 28, 1964    A. F. FARR    3,142,719
AUTOMATIC FLUID SAMPLING AND PHOTOMETRIC TESTING APPARATUS
Filed Sept. 4, 1962    3 Sheets-Sheet 3

INVENTOR
ANDREW F. FARR
BY
ATTORNEY

United States Patent Office 3,142,719
Patented July 28, 1964

3,142,719
AUTOMATIC FLUID SAMPLING AND PHOTO-
METRIC TESTING APPARATUS
Andrew F. Farr, South Gate, Calif.
(1503 E. Chevy Chase Drive, Glendale 6, Calif.)
Filed Sept. 4, 1962, Ser. No. 221,674
7 Claims. (Cl. 88—14)

This invention relates in general to liquid sampling and measuring instruments and in particular to a photometric apparatus for drawing in and expelling, in sequence, a series of liquid samples into and from an examination cell without contamination of the samples, and automatically measuring the optical properties of the samples while the liquid is in the cell.

One object of the invention is to provide an apparatus for automatically measuring the photometric properties of a liquid sample.

Another object is to provide a sample supplying device for drawing in and expelling a series of liquid samples in a measuring device.

Another object is to provide automatic purging means to remove completely a liquid sample drawn into the examination cell of a photometer apparatus or the like.

Another object is to minimize measuring errors normally introduced by positional or optical imperfections of an optical measuring cell.

Still another object is to provide a device for successively feeding in and expelling a plurality of different samples in a testing or analyzing apparatus without contamination of the samples.

A further object is to provide automatic means for accurately measuring out sequential quantities of a liquid.

These and other objects are attained by my invention which will be understood from the following description, reference being made to the accompanying drawings in which FIG. 1 is a front elevational view with parts broken away of an automatic photometer apparatus;

FIG. 2 is a fragmentary elevational view with parts removed for better showing the sample cell and the associated piston and cylinder means;

FIG. 3 is a vertical cross-sectional view taken on the line 3—3 of FIG. 1;

FIG. 4 is a fragmentary view partly in section on the line 4—4 of FIG. 3, showing the piston head on the piston rod;

FIG. 5 is an enlarged fragmentary view partly in section of the piston head and the bottom closure head for the cylinder;

FIG. 6 is an enlarged cross-sectional view taken on the line 6—6 of FIG. 3;

FIG. 7 is a cross-sectional view taken on the line 7—7 of FIG. 6;

FIG. 8 is a cross-sectional view taken on the line 8—8 of FIG. 3;

Figure 9:
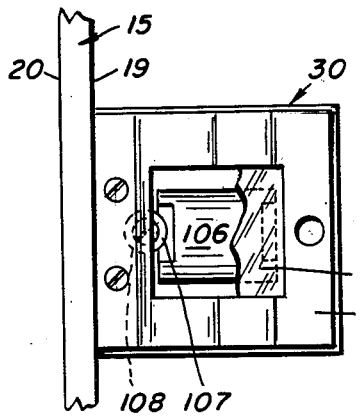
FIG. 9 is a cross-sectional view taken on the line 9—9 of FIG. 1.
Figure 10:
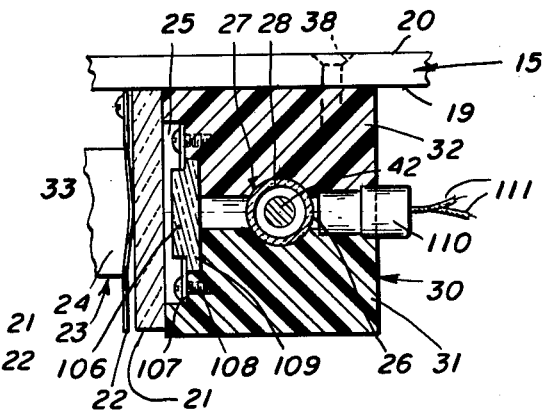
FIG. 10 is a cross-sectional view taken on the line 10—10 of FIG. 2.

In general, my automatic photometer consists essentially of (a) a light beam source; (b) a phototube disposed in alignment with a light beam from said source; (c) an examination cell with light-transparent opposed sides, aligned between the light beam source (a) and the phototube (b), the said examination cell being provided with piston means for drawing in through a capillary tube a liquid sample, and for expelling said sample through the same capillary tube after the intensity of light has been measured by the phototube; (d) air duct means entering below the piston for purging the cell and its inlet-outlet tube, and (e) means for recording the electrical impulses generated by the light beam passing through the liquid in the examination cell impinging upon the phototube. The automation consists in providing mechanical means for actuating control switches and an air valve, in sequence, following the initiation of a cycle by the manual insertion of a test tube containing the liquid sample to be tested, in a receiving socket where the content of said tube is in operative communication with the examination cell, and where an initiating switch sets the drive motor in operation.

Referring to the drawings, showing a typical embodiment of the invention, the mounting panel 15 is arranged vertically and adapted to be enclosed in a casing (not shown) having a front cover 16, on the front of which are mounted a main control manual switch 17 and a pilot or signal light 18. The examination cell piston operating means, and some other accessory parts are also mounted on the front 19 of the panel 15, while the motor, certain switches and valves, compressed air and electrical wiring elements are mounted on the rear face 20 of the panel, as will be more particularly described. The light beam source 23 is mounted behind the front cover 16, being disposed to direct a beam of light through the tube 24 into the examination cell 27.

The examination cell 27 consists of a cylindrical glass tube 28, supported vertically in a holding block 30 which is divided on a vertically disposed plane into a front portion 31 and a rear portion 32 together forming closely fitting matching cavities for the cylinder tube 28, an optical lens 33, an apertured cap 39 and a bottom closure head 36. The block portions 31 and 32 are held together by screws 34, and the composite block 30 is attached to the panel 15 by screws 38 extending into the block from the rear face 20 of the panel. The block portions are also recessed to form a window 25 which receives the light beam from the light beam source represented as 23 which includes an electric lamp (not shown) and the telescoping tube 24. A light condenser lens 106 is mounted by clips 107 and screws 108 in a recess 109 in the block 30. A spring holder 22 is also attached outside the window 25 to hold an interchangeable light filter 21 in the path of the light beam.

A photocell 110, for example one designated as International Rectifier Corp. DP-2 is mounted in a second window 26 opposite the light receiving window 25, a recess being provided in the portions 31 and 32 of the enclosing block 30. Electric wires 111 from the photocell 110 carry the generated electric current to the measuring means.

The glass tube 28 is provided at the upper end with a Teflon recessed cap 39, with a ground-in joint 40 to the outside wall of the tube 28, the cap having an axial hole 41 in which the piston rod 42 slides. The cap 39 is held in place in its recess in the enclosing block 30 by the end disk 43 of the crank frame 44, being held to the block by screws 45. A bushing 46 is provided in the end disk 43 for the piston rod 42.

The lower end of the glass tube 28 is fitted into the recess 47 of a Teflon bottom closure head 36, an O ring 48 being used to make a tight joint. The recess 47' below the lowest position of the piston head 82 is about .01 inch in depth. A capillary liquid outlet tube 52 of flexible synthetic plastic is attached to the bottom of the recess 47, this tube being in direct communication with the cylindrical interior of the tube 28. The tube 52 extends axially through the test tube socket member 51, being held and guided by a surrounding metal tube 49, for insertion in the sample containing test tube T.

A radial hole 68 is provided through the wall of the closure head 36 entering the recess 47' under the O ring 48, this radial hole communicating with a coinciding hole 69 in the rear block portion 32. The hole 69 communicates with the outlet of an air valve means 72 (such as a "Schrader" tire valve) which is embedded in a vertical position in a hole 70 in the rear block portion 32, the operating stem 73 of the valve extending above the top surface of said block portion 32, and a side tube 74 being connected by the coupling 75, extending through the mounting panel 15, to a compressed air supply line 76.

An air valve operating lever 78 is pivotally mounted on a bracket 79 attached to the rear block portion 32 in operative position relative to the stem 73 of the air valve means 72, the free end 80 of the lever 78 being actuated by contact with the collar 95 on the piston rod extension 92 near the lower end of its stroke, as will be later described.

The test tube socket member 51 consists of a short synthetic plastic tube 53 having an outwardly extending collar 54 which is provided with holes 55 in which screws 56 are engaged in the enclosing block 30 to hold the bottom closure head 36 securely against the lower end of the glass tube 28, encased in the provided cavity in said enclosing block. Three spaced apart longitudinal slots 58 are provided in the cylindrical wall of the tube 53 of the socket member 51, in each of which slots are mounted triggers 59 which are pivotally mounted at their upper ends 60 by the external spring ring 61, and spring biased by the external coiled spring ring 62 contacting said triggers at intermediate positions away from the pivot points.

Interiorly projecting cam surfaces 64 extend into the tube 53, and may be displaced outwardly by the rim 65 of a test tube T which may contain the liquid sample to be tested. When the triggers 59 are pressed outwardly against the coiled spring ring 62, the arm 66 of the microswitch 67 closes the initiating electric circuit to start the automatic performance of the apparatus.

The piston rod 42 is provided with a piston head 82 which reciprocates inside the glass tube 28. The head 82 (see FIG. 4) is a Teflon cup 83 having a thinned lip 84, a "Neoprene O-ring 85 being provided in the groove 86 near the end of the piston rod 42 and pressing the thinned lips outward to make close contact with the cylinder walls.

The piston rod 42 is reciprocated by the crank arm 88 which is attached to (by means of adapter 87) and rotates with the shaft 89 of the geared electric motor means 90 which is mounted on the rear face 20 of the panel 15. The crank arm 88 is pivotally connected to the link 91 which in turn is pivoted to the piston rod extension 92 which extends upward overlaying the crank arm 88 and the link 91 to slide in an upper bearing member 93 which is integral with the crank frame 44, and rigidly attached by screws 94 to the panel 15. The piston rod extension 92 is arranged to make contact with the actuating arm 96 of the micro-switch 97 near the top of the piston stroke, which switch opens a normally shorted electric circuit carrying the impulse which is generated in the phototube 110, to the recording means 99.

A rotary cam 102 is mounted on the shaft 89 adjacent the panel 15, and in rotating with said shaft at times actuates an operating lever 103 of the microswitch 104, which opens and closes the electrical circuit to the motor 90.

Figure 11:
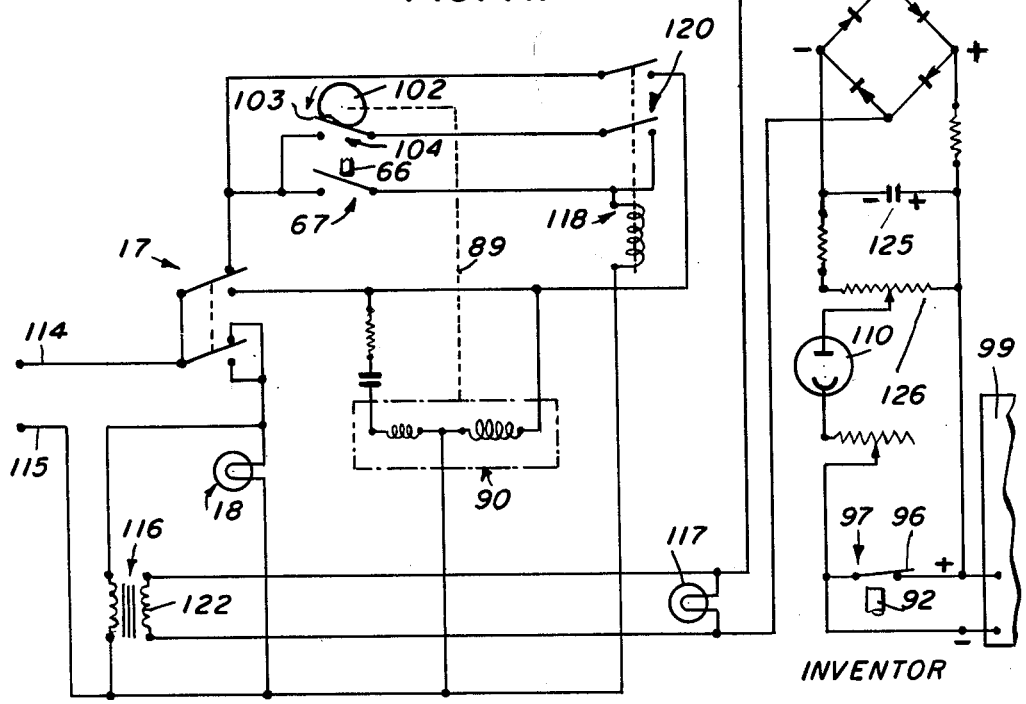
FIG. 11 is a schematic electrical wiring diagram for the apparatus.

Schematic electric circuits connecting the several parts of the apparatus are shown in FIG. 11. When the main control switch 17 is set manually to automatic operation, the input power circuit 114 and 115, the pilot light 18 and the step down transformer 116 are connected in, and the lamp 117 is lighted so that a beam of light is projected through the telescope tube 24, the color filter 21, the condenser lens 33, window 25, the examination cell tube 28, the outlet window 26 and onto the phototube 110. When the test tube T is inserted in the socket 51, the triggers 59 actuate the arm 66 of the microswitch 67, which actuates the relay 118 and starts motor 90, which closes the switch 120 in the cam controlled circuit. When the motor 90 has moved the piston head 82 from its lowest position (as a starting point of the cycle) to its upper limit (during which movement the test liquid is being drawn into the tube 28) the upper end of the piston rod extension 92 actuates the output switch 97, so that the electric impulse generated at the phototube 110 is connected to the recording means, to make a record of the intensity of the beam of light after it has passed through the test liquid in the tube 28. As the piston reverses, and moves downwardly, the switch 97 is closed to short the photocell output. The switch 104 is also held closed after the switch 67 is initially closed by the insertion of the test tube T as the cam 102 is rotated by the motor, this being important for the continuation of the automatic cycle, if and when the operator wishes to remove the test tube T before the piston head 82 has reached its lowest position, to facilitate the insertion of a new test tube.

As the piston rod extension 92 approaches the lowest point, the collar 95 thereon presses the free end 80 of the actuating lever 78 thereby pressing the stem 73 of the air valve 72, and compressed gas is admitted through the holes 69, 68 into the recess 47' of the plastic closure 36. This gas blows out all of the remaining test liquid below the piston head 82 and in the tube 49 and the flexible capillary tube 52. This blown out liquid may be collected into the drain 121, prior to inserting another test tube with a new sample in the tube socket 51.

The secondary winding 122 of a voltage stabilizing, step-down transformer 116 excites a solid state rectifier bridge 124, the output of which is filtered by capacitor 125 and applied to a voltage divider 126. The output from this network is used to balance any given output from the photocell 110; this provides a "zero control" which allows expanded scale operation of the instrument by a process of "zero suppression."

Any net potential from this zero balancing circuit generated by a changed output from the photocell is applied to a second voltage divider which acts as a "span control" for the instrument.

During all parts of the operating cycle except the reading portion, the photocell circuit is shorted through Switch 97 and appropriate resistors so that the recording device indicates true zero.

The purging of the cylinder and the in-and-out capillary tube connected to the recess below the piston head has been found to remove substantially all of the liquid of a given sample, so that the next sample is not appreciably contaminated, within the range of accuracy of photometer measurements. The apparatus permits the optical measurement of many samples in sequence without contamination of succeeding samples and a much lower cost for operating time.

The objectives stated in the beginning have been attained.

I claim:

1. An automatic photometer apparatus comprising in combination means for producing a light beam; a phototube member; a recording instrument adapted to receive and record in sequence the magnitude of the electrical impulses generated by a beam of light on said phototube member; an examination cell disposed between said light beam means and said phototube member, said examination cell comprising a tubular member having a cylindrical chamber, and having opposed transparent sidewalls disposed in axial alignment with the light beam from said light beam means and said phototube member; a closure member fastened to one end of said chamber, said closure member having a relatively small diameter inlet-outlet tube; a piston head operatively disposed within said chamber; means to reciprocate said head in said chamber, said head at its lowest position being spaced a small fractional inch from said closure member; and means to inject a stream of gas into the space between said closure member and said piston head and out through said inlet-outlet tube at the time when said piston head has reached its lowest point in its reciprocation.

2. An automatic photometer apparatus comprising in combination means for producing a light beam; a phototube member; a recording instrument adapted to receive and record in sequence the magnitude of the electrical impulses generated by a beam of light on said phototube member; an examination cell disposed between said light beam means and said phototube member, said examination cell comprising a tubular member having a cylindrical chamber, and having opposed transparent sidewalls disposed in axial alignment with the light beam from said light beam means and said phototube member; a closure member fastened to one end of said chamber, said closure member having a relatively small diameter inlet-outlet tube, a piston head operatively disposed within said chamber; a piston rod, crank, link and motor means assembly arranged to reciprocate said piston head in said chamber; said head at its lowest position being spaced a small fractional inch from said closure member; and means to inject a stream of gas into the space between said closure member and said piston head and out through said inlet-outlet tube at the time when said piston head has reached its lowest point in its reciprocation.

3. An automatic photometer apparatus comprising in combination means for producing a light beam; a phototube member; a recording instrument adapted to receive and record in sequence the magnitude of the electrical impulses generated by a beam of light on said phototube member; an examination cell disposed between said light beam means and said phototube member, said examination cell comprising a tubular member having a cylindrical chamber, and having opposed transparent sidewalls disposed in axial alignment with the light beam from said light beam means and said phototube member; a closure member fastened to one end of said chamber, said closure member having a relatively small diameter inlet-outlet tube, a piston head operatively disposed within said chamber; a piston rod, crank, link and motor means assembly arranged to reciprocate said piston head in said chamber; said head at its lowest position being spaced a small fractional inch from said closure member; and means including an air valve to inject a stream of gas into the space between said closure member and said piston head and out through said inlet-outlet tube; said air valve being opened by said piston rod when said piston head is at its lowest point in its reciprocation.

4. An automatic photometer apparatus comprising in combination means for producing a light beam; a phototube member; a recording instrument adapted to receive and record in sequence the magnitude of the electrical impulses generated by a beam of light on said phototube member; an examination cell disposed between said light beam means and said phototube member, said examination cell comprising a tubular member having a cylindrical chamber, and having opposed transparent sidewalls disposed in axial alignment with the light beam from said light beam means and said phototube member; a closure member fastened to the lower end of said chamber, said closure member having a capillary inlet-outlet tube extending therefrom, a piston head operatively disposed within said chamber, link and motor means assembly arranged to reciprocate said piston head in said chamber; said head at its lowest position being spaced a small fractional inch from said closure member; means to inject a stream of gas into the space between said closure member and said piston head and out through said inlet-outlet tube at the time when said piston head has reached its lowest point in its reciprocation; and a test tube socket member disposed in operative relation to said closure member and to said inlet-outlet tube, said test tube socket member being adapted to receive a test tube containing the sample of liquid to be photometrically examined after said gas stream has blown out the liquid remaining below said piston head, said socket member having switch actuating means to start said motor means.

5. An automatic photometer apparatus comprising in combination means for producing a light beam; a phototube member; a recording instrument adapted to receive and record in sequence the magnitude of the electrical impulses generated by a beam of light on said phototube member; an examination cell disposed between said light beam means and said phototube member, said examination cell comprising a tubular member having a cylindrical chamber, and having opposed transparent sidewalls disposed in axial alignment with the light beam from said light beam means and said phototube member; a closure member fastened to the lower end of said chamber, said closure member having a capillary inlet-outlet tube extending therefrom, a piston head operatively disposed within said chamber, link and motor means assembly arranged to reciprocate said piston head in said chamber; said head at its lowest position being spaced a small fractional inch from said closure member; means to inject a stream of gas into the space between said closure member and said piston head and out through said inlet-outlet tube at the time when said piston head has reached its lowest point in its reciprocation; and switch means actuated by said piston rod at the upper end of its stroke to electrically connect said recording instrument to said phototube member.

6. In an automatic photometer apparatus for use in measuring the optical properties of a liquid, an examination cell comprising a tubular member having a cylindrical chamber, and having opposed transparent side-walls; a closure member fastened to the lower end of said chamber, said closure member having a relatively small diameter inlet-outlet tube extending therefrom, a piston head operatively disposed for reciprocation within said chamber, said head at its lowest position being spaced a small fractional inch from said closure member; and means to inject a stream of gas into the space between said closure member and said piston head out through said capillary tube at the time when said piston head is at its lowest point.

7. An apparatus for accurately measuring out a succession of liquid samples comprising a tubular member having a cylindrical chamber, a closure member fastened to the lower end of said chamber, said closure member having a relatively small diameter flexible inlet-outlet tube extending therefrom, a piston head operatively disposed within said chamber, said head at its lowest position being spaced a small fractional inch from said closure member; means to reciprocate said piston head; means to inject a stream of gas into the space between said closure member and said piston head and out through said capillary tube at the time when said piston head is at its lowest point, whereby on its intake stroke a measured volume of liquid is drawn into said chamber, and all of said volume of liquid is expelled on its output stroke including the liquid remaining below the piston head at its lowest point, and the liquid remaining in said inlet-outlet tube.

No references cited.